US011664555B2

(12) United States Patent
Shi et al.

(10) Patent No.: US 11,664,555 B2
(45) Date of Patent: May 30, 2023

(54) SECONDARY BATTERY, BATTERY MODULE AND ELECTRIC VEHICLE

(71) Applicant: CONTEMPORARY AMPEREX TECHNOLOGY CO., LIMITED, Fujian (CN)

(72) Inventors: Dongyang Shi, Fujian (CN); Zhenhua Li, Fujian (CN); Haizu Jin, Fujian (CN); Ning Chen, Fujian (CN); Fei Hu, Fujian (CN); Yuanbao Chen, Fujian (CN); Rui Yang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/135,918

(22) Filed: Dec. 28, 2020

(65) Prior Publication Data

US 2021/0119297 A1    Apr. 22, 2021

Related U.S. Application Data

(63) Continuation of application No. PCT/CN2019/129624, filed on Dec. 28, 2019.

(30) Foreign Application Priority Data

Dec. 29, 2018    (CN) .......................... 201822269903.6

(51) Int. Cl.
*H01M 50/271*    (2021.01)
*B60L 50/64*    (2019.01)
(Continued)

(52) U.S. Cl.
CPC ........... *H01M 50/271* (2021.01); *B60L 50/64* (2019.02); *H01M 10/0431* (2013.01);
(Continued)

(58) Field of Classification Search
CPC .................. H01M 50/271–282; H01M 50/296
See application file for complete search history.

(56) References Cited

U.S. PATENT DOCUMENTS

2005/0287422 A1* 12/2005 Kim ................. H01M 50/3425
429/53
2008/0085446 A1    4/2008 Schmidt et al.
(Continued)

FOREIGN PATENT DOCUMENTS

CN          2578996 Y    10/2003
CN        200941411 Y     8/2007
(Continued)

OTHER PUBLICATIONS

Machine Translation of CN 200941411 Y (Year: 2007).*

*Primary Examiner* — Robert S Carrico
(74) *Attorney, Agent, or Firm* — Scully, Scott, Murphy & Presser, P.C.

(57) ABSTRACT

Disclosed are a secondary battery, a battery module and an electric vehicle. The secondary battery includes an electrode assembly, a housing and a top cover assembly. The housing has an accommodating chamber, the accommodating chamber having an opening, and the electrode assembly being accommodated in the accommodating chamber. The electrode assembly includes a plurality of electrode units, the plurality of electrode units being stacked in an axial direction of the accommodating chamber. The top cover assembly includes a top cover plate, a first electrode terminal and a second electrode terminal, the top cover plate being connected to the housing and located on a side of the electrode assembly in the axial direction, and the first electrode terminal and the second electrode terminal both protruding from the top cover plate and being electrically connected to the electrode assembly.

18 Claims, 4 Drawing Sheets

(51) Int. Cl.

| | |
|---|---|
| *H01M 50/249* | (2021.01) |
| *H01M 50/296* | (2021.01) |
| *H01M 50/342* | (2021.01) |
| *H01M 50/204* | (2021.01) |
| *H01M 50/593* | (2021.01) |
| *H01M 10/0525* | (2010.01) |
| *H01M 10/0587* | (2010.01) |
| *H01M 50/15* | (2021.01) |
| *H01M 10/04* | (2006.01) |
| *H01M 50/586* | (2021.01) |
| *H01M 50/55* | (2021.01) |
| *H01M 50/276* | (2021.01) |
| *H01M 50/224* | (2021.01) |
| *H01M 50/209* | (2021.01) |

(52) U.S. Cl.
CPC ... *H01M 10/0525* (2013.01); *H01M 10/0587* (2013.01); *H01M 50/15* (2021.01); *H01M 50/204* (2021.01); *H01M 50/249* (2021.01); *H01M 50/296* (2021.01); *H01M 50/3425* (2021.01); *H01M 50/55* (2021.01); *H01M 50/586* (2021.01); *H01M 50/593* (2021.01); *H01M 50/209* (2021.01); *H01M 50/224* (2021.01); *H01M 50/276* (2021.01); *H01M 2200/20* (2013.01); *H01M 2220/20* (2013.01)

(56) References Cited

U.S. PATENT DOCUMENTS

| | | | |
|---|---|---|---|
| 2009/0035648 A1 | 2/2009 | Kimura | |
| 2011/0104552 A1* | 5/2011 | Kim | H01M 50/20 429/151 |
| 2014/0220395 A1* | 8/2014 | Ootsuka | H01M 50/147 429/56 |
| 2015/0037616 A1* | 2/2015 | Wyatt | H01M 10/0525 429/7 |
| 2015/0214524 A1* | 7/2015 | Takasaki | H01M 50/50 429/82 |
| 2018/0026245 A1* | 1/2018 | Page | H01M 50/20 429/82 |
| 2018/0138565 A1* | 5/2018 | Lee | H01M 50/20 |
| 2019/0067650 A1 | 2/2019 | Li et al. | |

FOREIGN PATENT DOCUMENTS

| | | |
|---|---|---|
| CN | 101416343 A | 4/2009 |
| CN | 108428821 A | 8/2018 |
| CN | 209401683 U | 9/2019 |
| DE | 3133773 C1 | 12/1982 |
| DE | 102004052831 A1 | 5/2006 |
| JP | S6153852 U | 4/1986 |
| JP | 2014078498 A | 5/2014 |

* cited by examiner

SECONDARY BATTERY, BATTERY MODULE AND ELECTRIC VEHICLE

CROSS-REFERENCE TO RELATED APPLICATIONS

This application is a continuation of International Application No. PCT/CN2019/129624, filed on Dec. 28, 2019, which claims priority to Chinese Patent Application No. 201822269903.6, filed on Dec. 29, 2018. The disclosures of the aforementioned applications are hereby incorporated by reference in their entireties.

TECHNICAL FIELD

The present application relates to the field of batteries, and in particular to a battery, and a related device, preparation method and preparation apparatus thereof.

BACKGROUND

A battery module generally includes a plurality of secondary batteries arranged in sequence, and each of the secondary batteries is internally provided with an electrode assembly. During charging and discharging, the electrode assembly will expand in the arrangement direction of the secondary batteries, and the expansion force generated by the electrode assemblies of the plurality of secondary batteries will be superimposed in the arrangement direction and form a large resultant force; and the secondary batteries are squeezed under the resultant force to cause the secondary batteries to fail to operate normally, affecting the service life of the secondary batteries.

SUMMARY

In view of the problems in the background, the object of the present disclosure is to provide a secondary battery, a battery module and an electric vehicle, which can improve the performance and service life of the secondary battery.

In order to achieve the above object, the present disclosure provides a secondary battery. The secondary battery includes an electrode assembly, a housing and a top cover assembly. The housing has an accommodating chamber, the accommodating chamber having an opening, and the electrode assembly being accommodated in the accommodating chamber. The electrode assembly includes a plurality of electrode units, the plurality of electrode units being stacked in an axial direction of the accommodating chamber. The top cover assembly includes a top cover plate, a first electrode terminal and a second electrode terminal, the top cover plate being connected to the housing and located on a side of the electrode assembly in the axial direction, and the first electrode terminal and the second electrode terminal both protruding from the top cover plate and being electrically connected to the electrode assembly. In a lengthwise direction of the top cover plate, the first electrode terminal and the second electrode terminal are respectively located on two sides of the center of the top cover plate, and a distance between the first electrode terminal and the second electrode terminal being D1, a distance between the edge of the top cover plate close to the first electrode terminal and the first electrode terminal being D2, and the value of D1/D2 is 1-6.

In the secondary battery according to some embodiments, the value of D1/D2 is 1.5-5.

In the secondary battery according to some embodiments, the value of D1/D2 is 2.

In the secondary battery according to some embodiments, in the lengthwise direction of the top cover plate, a distance between the edge of the top cover plate close to the second electrode terminal and the second electrode terminal is D3, and D3 is equal to D2.

In the secondary battery according to some embodiments, the first electrode terminal and the second electrode terminal are symmetrically arranged with respect to the center of the top cover plate.

In the secondary battery according to some embodiments, a thickness of the top cover plate is positively correlated with a thickness of the electrode assembly.

In the secondary battery according to some embodiments, the electrode unit includes a first electrode plate, a second electrode plate and a membrane, which are coiled as a whole. The electrode unit has a main body region and corner regions, the corner regions being arranged at two ends of the main body region in a width direction. The main body regions of two adjacent electrode units are in contact with each other, and the main body regions of the electrode units are arranged opposite to the top cover plate.

In the secondary battery according to some embodiments, a ratio of a width of the main body region to a thickness of the top cover plate is 10-60.

In the secondary battery according to some embodiments, the width of the main body region is 30 mm to 60 mm, and the thickness of the top cover plate is 1 mm to 4 mm.

In the secondary battery according to some embodiments, the top cover assembly further includes a rupture plate, the rupture plate being arranged between the first electrode terminal and the second electrode terminal. The top cover plate is provided with a through hole, and the rupture plate is connected to the top cover plate and covers the through hole.

In the secondary battery according to some embodiments, a size of the rupture plate in a width direction of the top cover plate is greater than a size thereof in the lengthwise direction of the top cover plate.

In the secondary battery according to some embodiments, the top cover assembly includes an insulating member, the insulating member being arranged on a side of the top cover plate close to the electrode assembly and separating the top cover plate from the electrode assembly.

The present disclosure further provides a battery module, including the secondary battery as described above. A plurality of secondary batteries are provided and are arranged in sequence, and the arrangement direction of the plurality of secondary batteries is perpendicular to the axial direction.

In the battery module according to some embodiments, the battery module further includes two end plates, the two end plates being respectively located at two ends of the plurality of secondary batteries in the arrangement direction, and the two end plates clamping the plurality of secondary batteries.

The present disclosure further provides an electric vehicle including the battery module as described above.

The present disclosure has the following beneficial effects. In the present application, the plurality of electrode units in the secondary battery are arranged in the axial direction, and therefore, the expansion force of the plurality of electrode units will be superimposed in the axial direction. In the battery module, the arrangement direction of the plurality of secondary batteries is perpendicular to the axial direction, and therefore, even if the expansion amounts of all the electrode assemblies in the arrangement direction are superimposed together, no excessive resultant force will be generated, thereby preventing the secondary batteries from being crushed so as to ensure the performance and service life of the secondary batteries. In the present application, the first electrode terminal and the second electrode terminal are arranged close to the center of the top cover plate, which can increase the structural strength of a central region of the top cover plate in the lengthwise direction, thereby reducing the deformation of the top cover plate at the center so as to improve the appearance and performance of the secondary battery.

Figure 1:
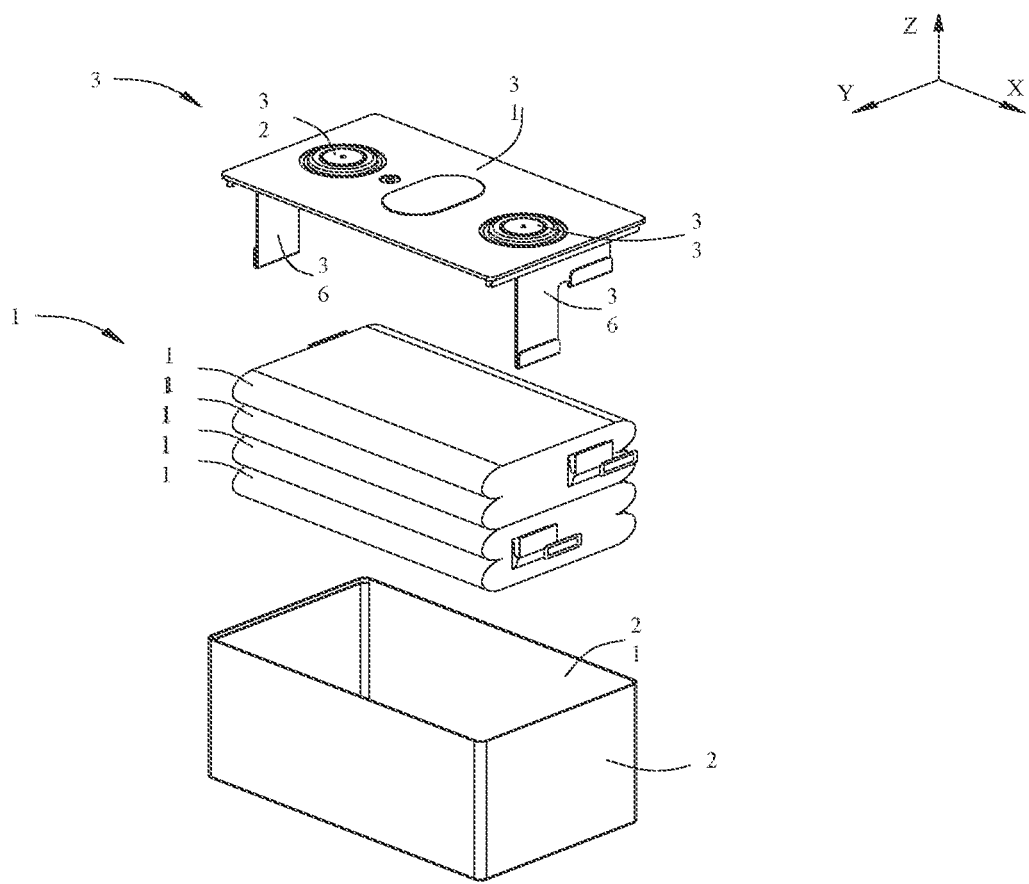
FIG. 1 is an exploded view of a secondary battery according to the present disclosure.

| | |
|---|---|
| 1 | Electrode assembly |
| 11 | Electrode unit |
| 111 | First electrode plate |
| 112 | Second electrode plate |
| 113 | Membrane |
| 2 | Housing |
| 21 | Accommodating chamber |
| 3 | Top cover assembly |
| 31 | Top cover plate |
| 311 | Through hole |
| 32 | First electrode terminal |
| 33 | Second electrode terminal |
| 34 | Insulating member |
| 35 | Rupture plate |
| 36 | Current collecting member |
| P1 | Main body region |
| P2 | Corner region |
| X | Lengthwise direction |
| Y | Width direction |
| Z | Height direction |

DESCRIPTION OF EMBODIMENTS

To make the objectives, technical solutions, and advantages of the present application clearer and more comprehensible, the present application is further illustrated in detail below in conjunction with the drawings and embodiments. It should be understood that the specific embodiments described herein are merely used to explain the present application and are not intended to limit the present application.

In the description of the present application, unless clearly specified and defined otherwise, the terms "first", "second" and "third" are only used for descriptive purposes, and cannot be understood as indicating or implying relative importance; the term "plurality" means two or more; and unless specified and defined otherwise, the terms "connection", "fixing", etc. should be understood in a broad sense, for example, "connection" may be a fixed connection, a detachable connection, an integral connection, or an electrical connection, or a signal connection; and "connection" may be a direct connection or an indirect connection via an intermediate medium. Those of ordinary skill in the art could understand the specific meanings of the foregoing terms in the present application according to specific circumstances.

In the description of this specification, it should be understood that the orientation words "up", "down", etc. described in embodiments of the present application are described from the angle shown in the accompanying drawings, and should not be understood as limiting the embodiments of the present application. The present application is further described in detail below by particular embodiments and with reference to the accompanying drawings.

In the present application, a battery module generally includes a secondary battery, an end plate, a side plate and a bus bar. A plurality of secondary batteries are provided and are arranged in sequence. The secondary battery of the present application may be a prismatic lithium-ion battery. The arrangement direction of the plurality of secondary batteries may be parallel to a width direction Y of the secondary batteries. Two end plates are provided and are respectively arranged at two ends of the plurality of secondary batteries in the arrangement direction, two side plates are provided and are respectively arranged on two sides of the plurality of secondary batteries, and the end plates and the side plates are welded together and form a rectangular frame. The plurality of secondary batteries are fixed to the frame. The bus bar connects the plurality of secondary batteries together in series, in parallel, or in series-parallel.

Figure 2:
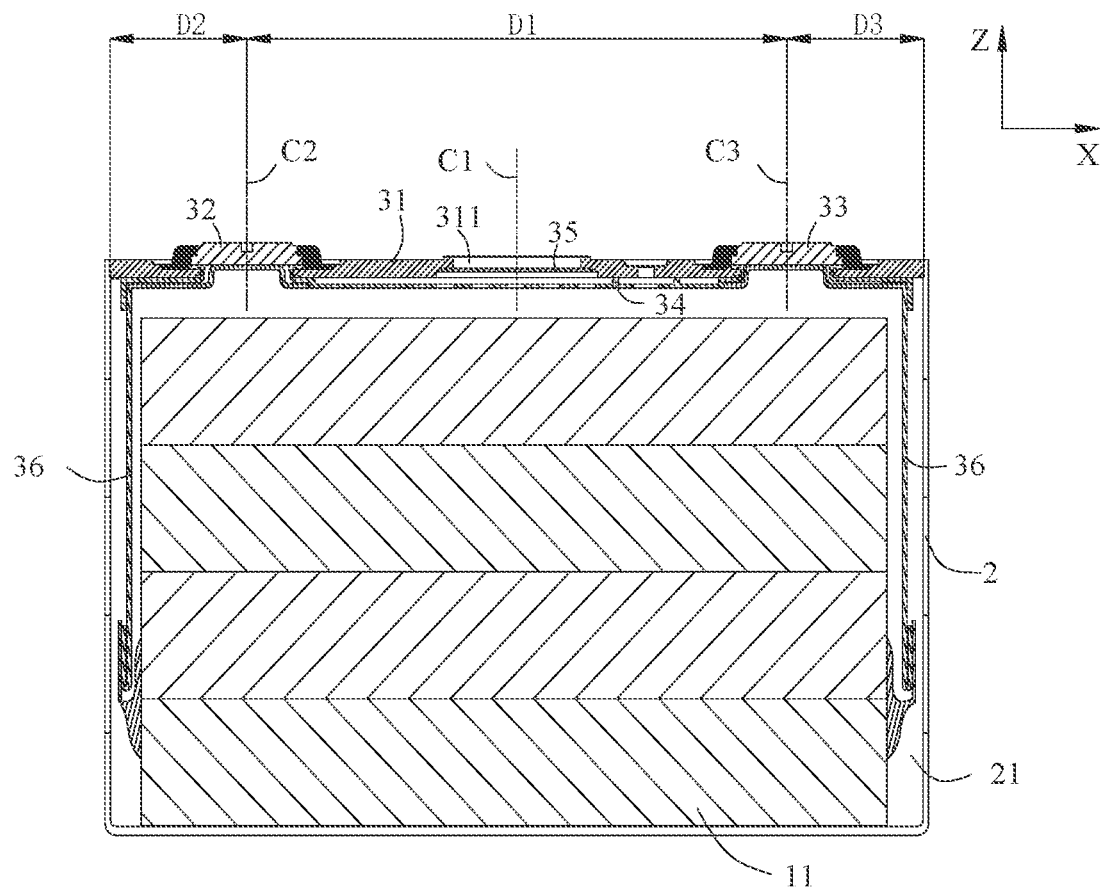
FIG. 2 is a cross-sectional view of the secondary battery according to the present disclosure.

Referring to FIGS. 1 and 2, the secondary battery of the present application includes an electrode assembly 1, a housing 2 and a top cover assembly 3.

An accommodating chamber 21 is formed inside the housing 2 to accommodate the electrode assembly 1 and an electrolytic solution. An opening is formed in the housing 2 at an end of the accommodating chamber 21 in an axial direction, and the electrode assembly 1 may be placed in the housing 2 through the opening. The housing 2 may be made of a conductive metal material such as aluminum or aluminum alloy.

The axial direction of the accommodating chamber 21 is parallel to an extending direction of the accommodating chamber 21 and is perpendicular to the plane where the opening is located. The battery module of the present application can be used in an electric vehicle. When the top cover assembly 3 of the secondary battery on the electric vehicle is approximately parallel to the ground, the axial direction of the accommodating chamber 21 is parallel to a height direction Z of the secondary battery and is perpendicular to the width direction Y and a lengthwise direction X of the secondary battery and the arrangement direction of the plurality of secondary batteries.

Figure 3:
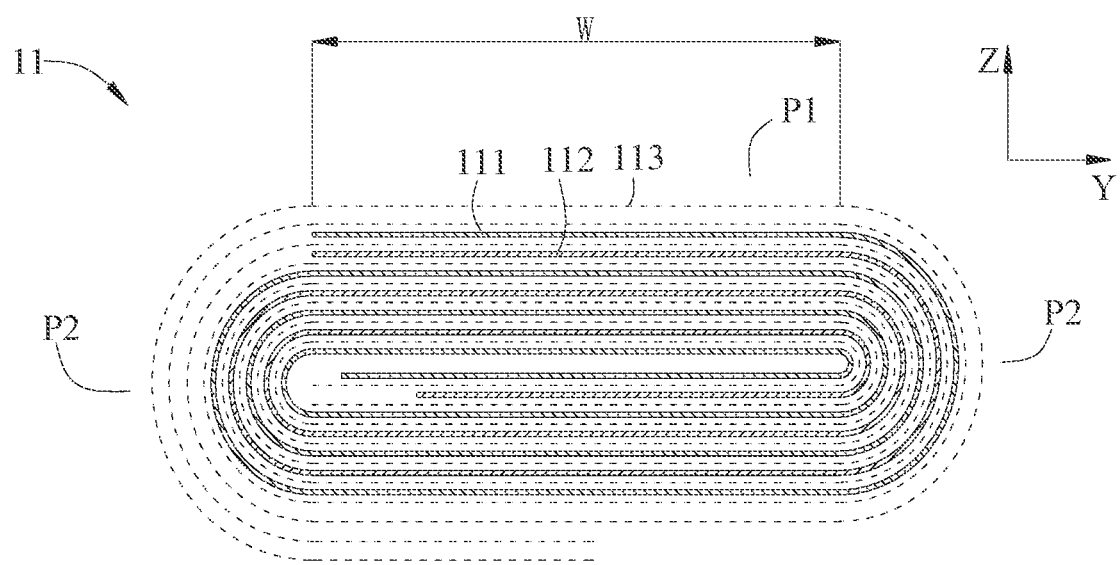
FIG. 3 is a cross-sectional view of an electrode assembly of the secondary battery according to the present disclosure.

The electrode assembly 1 includes a plurality of electrode units 11, the plurality of electrode units 11 being stacked in the axial direction of the accommodating chamber 21. Referring to FIG. 3, each of the electrode units 11 includes a first electrode plate 111, a second electrode plate 112 and a membrane 113, the membrane 113 separating the first electrode plate 111 from the second electrode plate 112. The electrode unit 11 may be formed by spirally coiling the first electrode plate 111, the second electrode plate 112 and the membrane 113, and the electrode unit 11 is pressed under pressure to form a flat structure. Alternatively, each of the electrode units 11 may also be formed by stacking the first electrode plate 111, the second electrode plate 112 and the membrane 113.

The top cover assembly 3 includes a top cover plate 31, a first electrode terminal 32, a second electrode terminal 33, an insulating member 34, a rupture plate 35 and a current collecting member 36. The top cover plate 31 is connected to the housing 2 and covers the opening of the housing 2 so as to enclose the electrode assembly 1 in the accommodating chamber 21 of the housing 2. The insulating member 34 is arranged on an inner side of the top cover plate 31 to separate the top cover plate 31 from the electrode assembly 1. The first electrode terminal 32 and the second electrode terminal 33 are arranged on the top cover plate 31, and the first electrode terminal 32 and the second electrode terminal 33 protrude to the outside of the top cover plate 31. Two current collecting members 36 are provided, one current collecting member 36 connecting the first electrode plate 111 and the first electrode terminal 32, and the other current collecting member 36 connecting the second electrode plate 112 and the second electrode terminal 33.

The top cover plate 31 is located on a side of the electrode assembly 1 in the axial direction. In other words, the top cover plate 31 is located at an end of the plurality of electrode units 11 in the arrangement direction. It is supplemented here that a lengthwise direction of the top cover plate 31 and a lengthwise direction of the electrode units 11 are both parallel to the lengthwise direction X of the secondary battery, a width direction of the top cover plate 31 and a width direction of the electrode units 11 are both parallel to the width direction Y of the secondary battery, and a thickness direction of the top cover plate 31 and a thickness direction of the electrode units 11 are both parallel to the height direction Z of the secondary battery.

During charging and discharging, each electrode unit 11 will expand. In the present application, the plurality of electrode units 11 in the secondary battery are arranged in the axial direction of the accommodating chamber 21, and therefore, the expansion of the plurality of electrode units 11 will be superimposed in the axial direction. In the width direction Y of the secondary battery, the expansion of the plurality of electrode units 11 is small, and therefore, the overall expansion amount of the electrode assembly 1 in the width direction Y is small. Accordingly, the expansion force of the electrode assembly 1 acting on the housing 2 is also small.

In the battery module, the arrangement direction of the plurality of secondary batteries is perpendicular to the axial direction of the accommodating chamber 21, and therefore, even if the expansion amounts of all the electrode assemblies 1 in the arrangement direction are superimposed together, no excessive resultant force will be generated, thereby preventing the secondary batteries from being crushed so as to ensure the performance and service life of the secondary batteries.

In addition, in the known technology, the two end plates of the battery module need to clamp the plurality of secondary batteries. If the resultant force generated by the expansion of the secondary batteries is too large, the welds between the end plates and the side plates may break, resulting in failure of the battery module. However, in the present application, the resultant force generated by the plurality of secondary batteries during expansion is small, thereby avoiding failure of the battery module.

In the secondary battery, when the electrode units 11 expand, the expansion amounts of the plurality of electrode units 11 are superimposed in the axial direction, thereby causing the electrode units 11 to squeeze the insulating member 34. When the electrode assembly 1 squeezes the insulating member 34, the expansion force will be transferred to the top cover plate 31, and therefore, the top cover plate 31 is likely to deform under the action of the expansion force, thereby affecting the appearance and performance of the secondary battery.

The electrode terminals (the first electrode terminal 32 and the second electrode terminal 33) need to be fixed to the top cover plate 31 by means of some mechanical members, and at the same time, the electrode terminals are also connected to the current collecting members 36. Therefore, at the position where the electrode terminals are provided, the deformation of the top cover plate 31 will be restricted by the mechanical members such as the electrode terminals. In other words, at the position where the electrode terminals are provided, the top cover plate 31 has a higher structural strength.

Referring to FIG. 2, in the lengthwise direction of the top cover plate 31, the first electrode terminal 32 and the second electrode terminal 33 are respectively located on two sides of the center C1 of the top cover plate 31. In order to reduce the deformation of the top cover plate 31 at the center C1, in the present application, the first electrode terminal 32 and the second electrode terminal 33 are preferably arranged close to the center C1 of the top cover plate 31, which can increase the structural strength of a central region (i.e., a region between the first electrode terminal 32 and the second electrode terminal 33) of the top cover plate 31 in the lengthwise direction, thereby reducing the deformation of the top cover plate 31 at the center C1 so as to improve the appearance and performance of the secondary battery.

In the lengthwise direction of the top cover plate 31, the distance between the first electrode terminal 32 and the second electrode terminal 33 is D1. In particular, D1 is the distance between the center C2 of the first electrode terminal 32 and the center C3 of the second electrode terminal 33.

In the lengthwise direction of the top cover plate 31, the distance between the edge of the top cover plate 31 close to the first electrode terminal 32 and the first electrode terminal 32 is D2. In particular, D2 is the distance between the center C2 of the first electrode terminal 32 and the edge of the top cover plate 31.

The smaller the value of D1, the higher the structural strength of the top cover plate 31 in the central region, and the smaller the degree of deformation; and at the same time, the larger the value of D1, the lower the structural strength of the top cover plate 31 in the central region.

If the ratio of D1/D2 is too large (e.g., D1/D2 is greater than 6), the distance between the first electrode terminal 32 and the second electrode terminal 33 is too large. In the case that the thickness of the top cover plate 31 remains unchanged, compared with an edge region (i.e., a region of the top cover plate 31 located on a side of the first electrode terminal 32 away from the second electrode terminal 33) of the top cover plate 31, the deformation of the central region of the top cover plate 31 is more serious, thereby damaging other mechanical members that cooperate with the top cover plate 31 so as to affect the appearance and performance of the secondary battery.

If the ratio of D1/D2 is too small (e.g., D1/D2 is less than 1), the space between the first electrode terminal 32 and the second electrode terminal 33 of the top cover plate 31 is limited, and other mechanical members (e.g., the rupture plate 35) cannot be provided; and at the same time, if the value of D2 is too large, the strength of the edge region of the top cover plate 31 is relatively low. Under the action of the expansion force, the edge region deforms seriously, which causes the housing 2 and the top cover plate 31 to separate, resulting in safety risks.

Therefore, preferably, in the present application, the value of D1/D2 is 1-6.

It is supplemented here that in the known technology, the electrode units 11 are generally arranged in the width direction Y of the secondary battery, the top cover plate 31 will not be affected by the expansion force, and the top cover plate 31 does not need too high structural strength. Therefore, the electrode terminals of the known technology are arranged close to the edge of the top cover plate 31.

The first electrode terminal 32 and the second electrode terminal 33 are symmetrically arranged with respect to the center C1 of the top cover plate 31. It is explained here that the symmetry means that the center C2 of the first electrode terminal 32 and the center C3 of the second electrode terminal 33 are symmetrical about the center C1 of the top cover plate 31 in the lengthwise direction X, and it is not required that the shape of the first electrode terminal 32 is completely the same as the shape of the second electrode terminal 33. In this case, in the lengthwise direction of the top cover plate 31, the distance between the edge of the top cover plate 31 close to the second electrode terminal 33 and the center C3 of the second electrode terminal 33 is D3, and D3 is equal to D2.

When the first electrode terminal 32 and the second electrode terminal 33 are symmetrically arranged, the top cover plate 31 has the similar structural strength and deformation on two sides of the center C1, thereby improving the uniformity of the overall deformation of the top cover plate 31.

The value of D1/D2 is preferably 1.5-5. In this way, the difference in deformation between the center region and the edge region of the top cover plate 31 can be reduced, improving the uniformity of the overall strength of the top cover plate 31.

Further, the value of D1/D2 is preferably 2, and the value of D1/D3 is preferably 2. In this case, in the lengthwise direction X, the top cover plate 31 is divided into four equal parts by the center C2 of the first electrode terminal 32, the center C1 of the top cover plate 31, and the center C3 of the second electrode terminal 33, such that the influence of the first electrode terminal 32 and the second electrode terminal 33 on the structural strength of the top cover plate 31 is more uniform, thereby reducing the difference in deformation of the top cover plate 31 under the action of the expansion force.

The greater the thickness of the electrode assembly 1 in the height direction Z, the greater the expansion force of the electrode assembly 1, and the greater the deformation of the top cover plate 31; and the greater the thickness of the top cover plate 31 in the height direction Z, the higher its strength, and the stronger its resistance to deformation. Therefore, in the present application, the thickness T of the top cover plate 31 is positively correlated with the thickness of the electrode assembly 1. The top cover plate 31 may be formed of a metal plate with uniform thickness by stamping.

Referring to FIG. 3, the electrode unit 11 is coiled to form a flat structure, which has a main body region P1 and corner regions P2, the corner regions P2 being arranged at two ends of the main body region P1 in the width direction. The width direction of the main body region P1 is parallel to the width direction Y of the secondary battery.

Before the electrode unit 11 expands, the first electrode plate 111 and the second electrode plate 112 in the main body region P1 are substantially perpendicular to the height direction Z, and the first electrode plate 111 and the second electrode plate 112 in the corner region P2 are substantially arc-shaped. When the electrode unit 11 expands, the expansion thereof in the height direction Z originates from the expansion of the main body region P1.

In the secondary battery, the plurality of electrode units 11 are directly stacked in the height direction Z, and the main body regions P1 of two adjacent electrode units 11 are in contact with each other.

The main body region P1 of the uppermost electrode unit 11 (i.e., the electrode unit 11 closest to the top cover plate 31) is vertically arranged opposite to the top cover plate 31 in the height direction Z. Before the electrode unit 11 expands, a surface of the main body region P1 close to the top cover plate 31 is substantially parallel to a surface of the top cover plate 31 close to the main body region P1. When the electrode unit 11 expands, the two surfaces opposite each other can achieve more uniform stress therebetween.

Figure 4:
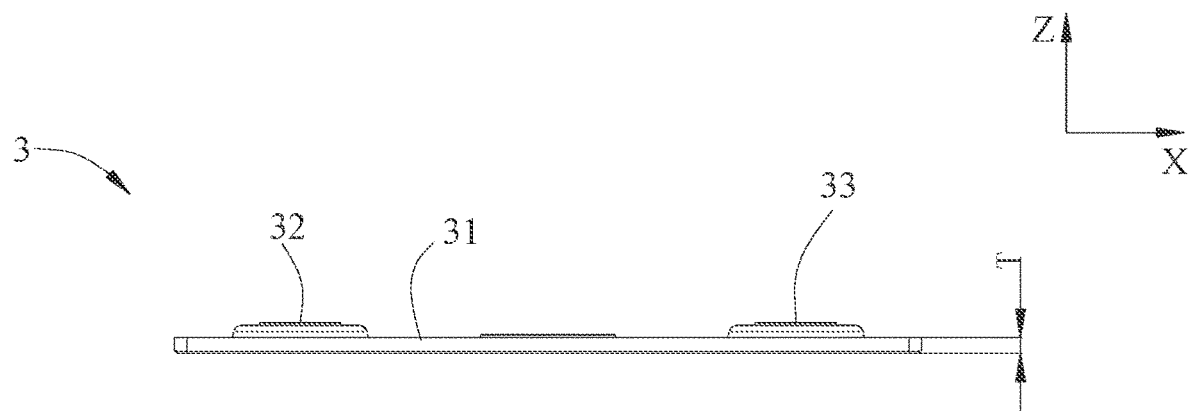
FIG. 4 is a front view of a top cover assembly of the secondary battery according to the present disclosure, with an insulating member and a current collecting member being omitted.

Referring to FIG. 3, the width of the main body region P1 in the width direction Y is W. Referring to FIG. 4, the thickness of the top cover plate 31 in the height direction Z is T, and the value of W/T is preferably 10-60.

When W/T>60, the force of the main body region P1 acting on the insulating member 34 and the top cover plate 31 during expansion is larger, while the strength of the top cover plate 31 is lower, so the top cover plate 31 cannot effectively constrain the main body region P1, thus causing the severe deformation of the top cover plate 31 and the main body region P1. When the top cover plate 31 is severely deformed, the electrode terminal will be offset, causing the electrode terminal to separate from the bus bar of the battery module, thus resulting in failure of the battery module. When the main body region P1 is severely deformed, the outermost electrode plate of the electrode unit 11 is likely to be broken due to stress concentration, thereby reducing the performance of the secondary battery. Therefore, preferably, W/T<60.

When W/T<10, the thickness of the top cover plate 31 is too large, and the strength thereof is high. Therefore, the top cover plate 31 can effectively constrain the main body region P1. However, due to the high strength of the top cover plate 31, the expansion force cannot be released by means of a slight deformation, so the top cover plate 31 will apply a large reaction force to the main body region P1; and at the same time, when the electrode unit 11 expands, the smaller the width of the main body region P1, the larger the binding force of the corner region P2 to the main body region P1 in the height direction Z. Under the combined action of the reaction force and the binding force, the gap between the first electrode plate 111 and the second electrode plate 112 in the main body region P1 becomes smaller, such that the electrolytic solution cannot penetrate into the main body region P1, causing a lithium precipitation problem. Therefore, preferably, W/T>10.

Specifically, the width W of the main body region P1 is preferably 30 mm to 60 mm, and the thickness T of the top cover plate 31 is preferably 1 mm to 4 mm.

Referring to FIG. 2, the top cover plate 31 is provided with a through hole 311, and the rupture plate 35 is connected to the top cover plate 31 and covers the through hole 311. In the lengthwise direction of the top cover plate 31, the rupture plate 35 is arranged between the first electrode terminal 32 and the second electrode terminal 33.

The rupture plate 35 has indentations. When the secondary battery is short-circuited, the electrode assembly 1 generates a large amount of gas, and the gas can break through the rupture plate 35 so as to be discharged to the outside of the secondary battery in time, thereby avoiding explosion to reduce safety risks.

When a middle region of the top cover plate 31 is deformed, the rupture plate 35 will also deform accordingly; and at the same time, the through hole 311 will reduce the structural strength of the middle region of the top cover plate 31. If the middle region of the top cover plate 31 is severely deformed, the rupture plate 35 is prone to excessive deformation and rupture, resulting in failure of the rupture plate 35 to cause safety risks. However, in the present application, by means of providing the first electrode terminal 32 and the second electrode terminal 33 close to the center C1 of the top cover plate 31, the structural strength of the middle region of the top cover plate 31 can be increased, thereby reducing the deformation of the rupture plate 35 to reduce the risk of the rupture plate 35 breaking under normal conditions.

Figure 5:
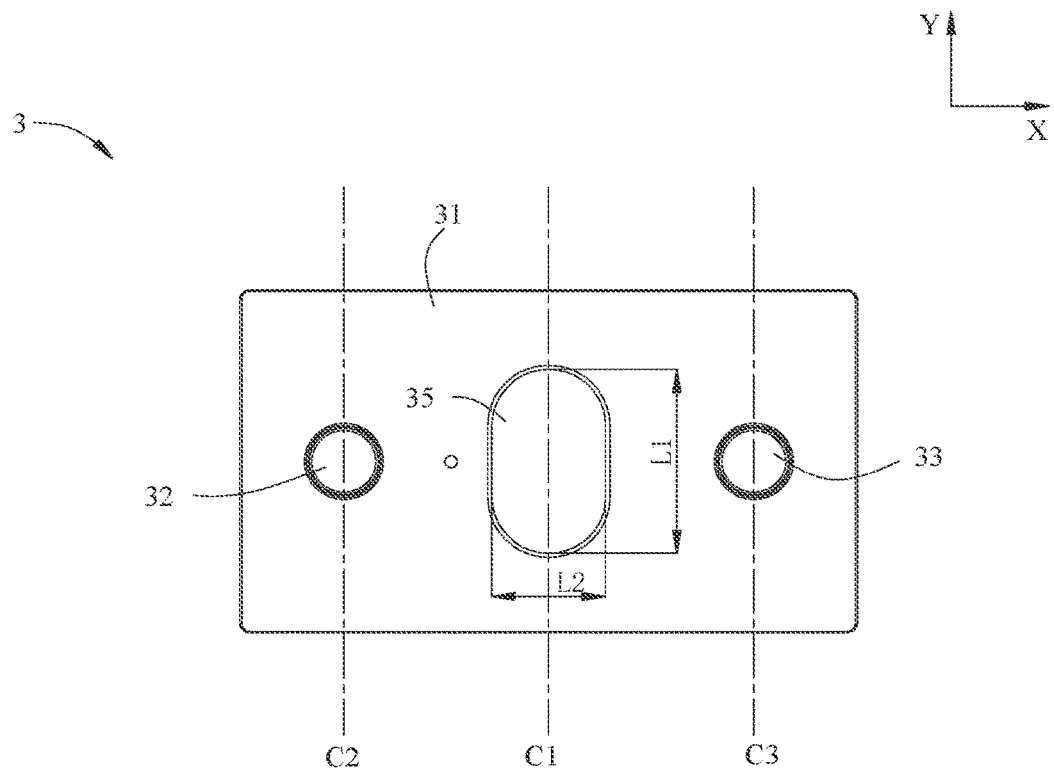
FIG. 5 is a bottom view of the top cover assembly in FIG. 4.

Referring to FIG. 5, the size of the rupture plate 35 in the width direction of the top cover plate 31 is L1, and the size of the rupture plate 35 in the lengthwise direction of the top cover plate 31 is L2.

Figure 6:
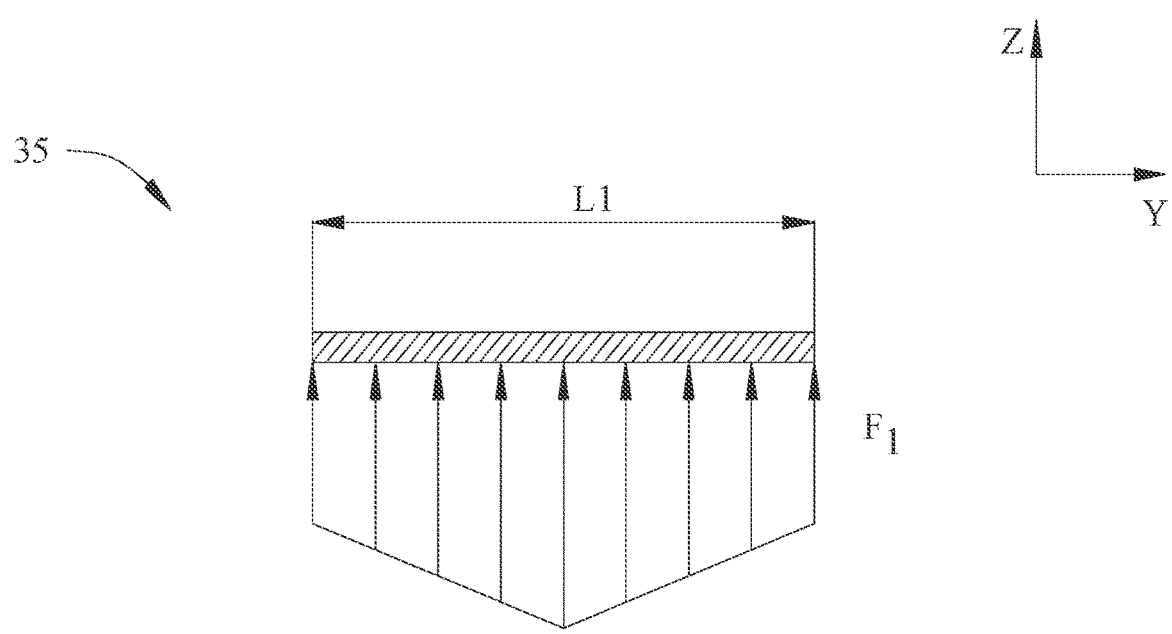
FIG. 6 is a schematic diagram of a rupture plate under force.
Figure 7:
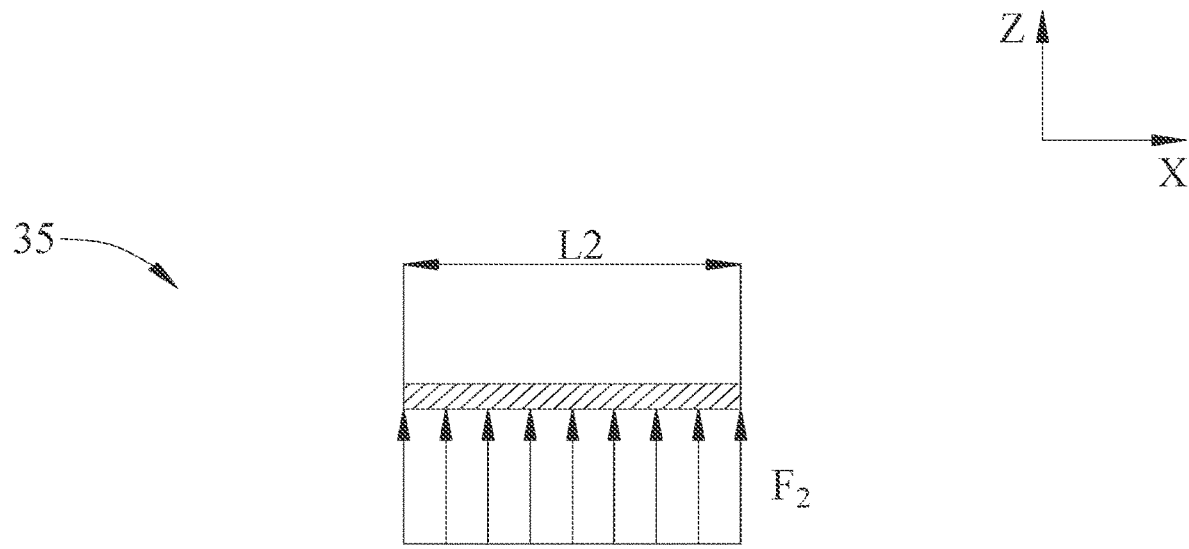
FIG. 7 is another schematic diagram of the rupture plate under force.

During charging and discharging, the electrode unit 11 will expand. Referring to FIG. 3, two ends of the main body region P1 in the width direction are restricted by the corner region P2, so the middle of the main body region P1 in the width direction expands more, while the ends thereof close to the corner region P2 expand less. In other words, referring to FIG. 6, in the width direction, the expansion force F1 applied to the rupture plate 35 gradually decreases in a direction away from the middle. In the lengthwise direction, the expansion degree of the main body region P1 is substantially the same, that is, referring to FIG. 7, in the lengthwise direction, the expansion force F2 applied to the rupture plate 35 is substantially the same.

If the rupture plate 35 as a whole extends in the lengthwise direction of the top cover plate 31, i.e., L2 is greater than L1, the expansion force applied to the rupture plate 35 as a whole is too large and is likely to be broken. Therefore, according to the present application, under the premise of ensuring the same area, by means of increasing the size of L1 and reducing the size of L2, the expansion force applied to the rupture plate 35 as a whole can be reduced so as to reduce the risk of breakage.

In addition, in the lengthwise direction of the top cover plate, the space between the first electrode terminal 32 and the second electrode terminal 33 is limited, and therefore, according to the present application, by means of reducing the size of L2, the space occupied by the rupture plate 35 in the lengthwise direction of the top cover plate 31 can be reduced.

What is claimed is:

1. A secondary battery, comprising an electrode assembly, a housing and a top cover assembly, wherein
    the housing has an accommodating chamber, the accommodating chamber having an opening, and the electrode assembly being accommodated in the accommodating chamber;
    the electrode assembly comprises a plurality of electrode units, the plurality of electrode units being stacked in an axial direction of the accommodating chamber;
    the top cover assembly comprises a top cover plate, a first electrode terminal and a second electrode terminal, the top cover plate being connected to the housing and located on a side of the electrode assembly in the axial direction, and the first electrode terminal and the second electrode terminal both protruding from the top cover plate and being electrically connected to the electrode assembly; and
    in a lengthwise direction of the top cover plate, the first electrode terminal and the second electrode terminal are respectively located on two sides of the center of the top cover plate, and a distance between the first electrode terminal and the second electrode terminal is D1, a distance between an edge of the top cover plate close to the first electrode terminal and the first electrode terminal is D2, and the value of D1/D2 is 1-6;
    wherein
    the electrode unit comprises a first electrode plate, a second electrode plate and a membrane, which are coiled as a whole; and
    the electrode unit has a main body region and corner regions, the corner regions being arranged at two ends of the main body region in a width direction, the main body regions of two adjacent electrode units being in contact with each other, and the main body regions of the electrode units being arranged opposite to the top cover plate;
    wherein a ratio of a width of the main body region to a thickness of the top cover plate is 10-60;
    wherein the housing is a cuboid shape.

2. The secondary battery according to claim 1, wherein the value of D1/D2 is 1.5-5.

3. The secondary battery according to claim 2, wherein the value of D1/D2 is 2.

4. The secondary battery according to claim 1, wherein in the lengthwise direction of the top cover plate, a distance between the edge of the top cover plate close to the second electrode terminal and the second electrode terminal is D3, and D3 is equal to D2.

5. The secondary battery according to claim 1, wherein the first electrode terminal and the second electrode terminal are symmetrically arranged with respect to the center of the top cover plate.

6. The secondary battery according to claim 1, wherein a thickness of the top cover plate is positively correlated with a thickness of the electrode assembly.

7. The secondary battery according to claim 1, wherein the width of the main body region is 30 mm to 60 mm, and the thickness of the top cover plate is 1 mm to 4 mm.

8. The secondary battery according to claim 1, wherein
    the top cover assembly further comprises a rupture plate, the rupture plate being arranged between the first electrode terminal and the second electrode terminal; and
    the top cover plate is provided with a through hole, and the rupture plate is connected to the top cover plate and covers the through hole.

9. The secondary battery according to claim 8, wherein a size of the rupture plate in a width direction of the top cover plate is greater than the size thereof in the lengthwise direction of the top cover plate.

10. The secondary battery according to claim 1, wherein
    the top cover assembly comprises an insulating member, the insulating member being arranged on a side of the top cover plate close to the electrode assembly and separating the top cover plate from the electrode assembly.

11. A battery module, comprising a secondary battery, the secondary battery comprising an electrode assembly, a housing and a top cover assembly, wherein
    the housing has an accommodating chamber, the accommodating chamber having an opening, and the electrode assembly being accommodated in the accommodating chamber;

the electrode assembly comprises a plurality of electrode units, the plurality of electrode units being stacked in an axial direction of the accommodating chamber;

the top cover assembly comprises a top cover plate, a first electrode terminal and a second electrode terminal, the top cover plate being connected to the housing and located on a side of the electrode assembly in the axial direction, and the first electrode terminal and the second electrode terminal both protruding from the top cover plate and being electrically connected to the electrode assembly; and in a lengthwise direction of the top cover plate, the first electrode terminal and the second electrode terminal are respectively located on two sides of the center of the top cover plate, and a distance between the first electrode terminal and the second electrode terminal is D1, a distance between an edge of the top cover plate close to the first electrode terminal and the first electrode terminal is D2, and the value of D1/D2 is 1-6;

wherein a plurality of secondary batteries are provided and are arranged in sequence, and the arrangement direction of the plurality of secondary batteries is perpendicular to the axial direction;

wherein the electrode unit comprises a first electrode plate, a second electrode plate and a membrane, which are coiled as a whole; and the electrode unit has a main body region and corner regions, the corner regions being arranged at two ends of the main body region in a width direction, the main body regions of two adjacent electrode units being in contact with each other, and the main body regions of the electrode units being arranged opposite to the top cover plate;

wherein a ratio of a width of the main body region to a thickness of the top cover plate is 10-60;

wherein the housing is a cuboid shape.

12. The battery module according to claim 11, further comprising two end plates, the two end plates being respectively located at two ends of the plurality of secondary batteries in the arrangement direction, and the two end plates clamping the plurality of secondary batteries.

13. The battery module according to claim 11, wherein the value of D1/D2 is 1.5-5.

14. The battery module according to claim 13, wherein the value of D1/D2 is 2.

15. The battery module according to claim 11, wherein in the lengthwise direction of the top cover plate, a distance between the edge of the top cover plate close to the second electrode terminal and the second electrode terminal is D3, and D3 is equal to D2.

16. An electric vehicle, comprising a battery module, the battery module comprising a secondary battery, the secondary battery comprising an electrode assembly, a housing and a top cover assembly, wherein the housing has an accommodating chamber, the accommodating chamber having an opening, and the electrode assembly being accommodated in the accommodating chamber;

the electrode assembly comprises a plurality of electrode units, the plurality of electrode units being stacked in an axial direction of the accommodating chamber;

the top cover assembly comprises a top cover plate, a first electrode terminal and a second electrode terminal, the top cover plate being connected to the housing and located on a side of the electrode assembly in the axial direction, and the first electrode terminal and the second electrode terminal both protruding from the top cover plate and being electrically connected to the electrode assembly; and in a lengthwise direction of the top cover plate, the first electrode terminal and the second electrode terminal are respectively located on two sides of the center of the top cover plate, and a distance between the first electrode terminal and the second electrode terminal is D1, a distance between an edge of the top cover plate close to the first electrode terminal and the first electrode terminal is D2, and the value of D1/D2 is 1-6;

wherein a plurality of secondary batteries are provided and are arranged in sequence, and the arrangement direction of the plurality of secondary batteries is perpendicular to the axial direction;

wherein the electrode unit comprises a first electrode plate, a second electrode plate and a membrane, which are coiled as a whole; and the electrode unit has a main body region and corner regions, the corner regions being arranged at two ends of the main body region in a width direction, the main body regions of two adjacent electrode units being in contact with each other, and the main body regions of the electrode units being arranged opposite to the top cover plate;

wherein a ratio of a width of the main body region to a thickness of the top cover plate is 10-60;

wherein the housing is a cuboid shape.

17. The electric vehicle according to claim 16, the battery further comprising two end plates, the two end plates being respectively located at two ends of the plurality of secondary batteries in the arrangement direction, and the two end plates clamping the plurality of secondary batteries.

18. The electric vehicle according to claim 16, wherein the value of D1/D2 is 1.5-5.1.

* * * * *